United States Patent [19]

Bergmann

[11] Patent Number: 4,648,633
[45] Date of Patent: Mar. 10, 1987

[54] SOCKET JOINT

[75] Inventor: Bernhard Bergmann, Balsthal, Switzerland

[73] Assignee: Von Roll AG, Gerlafingen, Switzerland

[21] Appl. No.: 770,222

[22] Filed: Aug. 28, 1985

[30] Foreign Application Priority Data

Sep. 17, 1984 [CH] Switzerland ............ 4450/84

[51] Int. Cl.⁴ ............................................. F16L 19/03
[52] U.S. Cl. ................................. 285/337; 285/348; 285/354
[58] Field of Search ............... 285/337, 105, 104, 113, 285/348, 354, 359

[56] References Cited

U.S. PATENT DOCUMENTS

| | | | |
|---|---|---|---|
| 1,911,659 | 5/1933 | Weaver | 285/348 X |
| 2,105,747 | 1/1938 | Martin et al. | 285/359 |
| 2,452,277 | 10/1948 | Woodling | 285/348 X |
| 2,561,887 | 7/1951 | Risley | 285/348 X |
| 3,480,300 | 11/1969 | Jeffery et al. | 285/354 X |
| 3,733,093 | 5/1973 | Seiler | 285/348 X |
| 3,751,078 | 8/1973 | O'Brian et al. | 285/348 X |
| 3,809,413 | 5/1974 | Boisserand | 285/348 |
| 4,330,143 | 5/1982 | Reneau | 285/15 X |

FOREIGN PATENT DOCUMENTS 2162435 4/1975 Fed. Rep. of Germany .
569913 11/1975 Switzerland .
622597 4/1981 Switzerland .
8703 of 1896 United Kingdom ............ 285/387

Primary Examiner—Richard J. Scanlan, Jr.
Assistant Examiner—Joseph A. Fischetti
Attorney, Agent, or Firm—Bachman & LaPointe

[57] ABSTRACT

The spigot end of one pipeline element is inserted in the socket end of the other pipeline element and is sealed by a gasket. To the end face of the socket end is connected a thrust preventing ring, which is secured by claws to part of a collar. A retaining ring engages on the inner surface of the thrust preventing ring and its inner face is provided with a tooth system, which is fixed to the surface of the spigot end. Between the end face of the socket end and the retaining ring is provided a thrust ring, which exerts a pressure on the retaining ring. By means of in each case one packing element on the side of the thrust preventing ring facing and remote from the socket end, said ring is located in a sealed and consequently corrosion-proof zone. Thus, the socket joint is secured without any modification to the pipeline elements.

12 Claims, 6 Drawing Figures

SOCKET JOINT

BACKGROUND OF THE INVENTION

The present invention relates to a socket joint for two pipeline elements, in which the spigot end of one pipeline element is inserted in the socket end of the other pipeline element and is sealed by an elastomeric gasket. As a thrust or shear preventer the outer circumference of one pipeline element is embraced by a retaining ring on which is supported a thrust or shear preventing ring, which is fixed to the socket other end of the other pipeline element.

The socket joint is a known and frequently used pipe connection or coupling, which is in particular used in the case of cast pressure pipes, shaped parts and fittings and which has proved satisfactory under difficult operating conditions. However, the socket joint suffers from the disadvantage that it is unable to absorb axially directed forces, so that additional anchoring means must be used for such an application.

It is further known to construct the socket joint in such a way that it can absorb axial forces. These additional means are called a thrust preventer and various constructions thereof are known. In one construction (Swiss Pat. No. 622 597 and German Pat. No. 21 62 435), the thrust preventer essentially comprises a retaining ring and a thrust preventing ring. The retaining ring is placed on the spigot end of one pipeline element and is provided on its inner circumference with a tooth system ensuring the non-positive engagement of the spigot end of one pipeline element via retaining and thrust preventing rings on the other pipeline element. In another construction, the inner circumference of the surface is smooth and a bead located at the spigot end permits the non-positive engagement of the latter on the retaining ring. The outer circumference of the retaining ring is constructed as a spherical zone, on which is supported the spherically constructed inner surface of the thrust preventing ring, which is connected to the socket end, e.g. by retaining claws.

Both constructions suffer from significant disadvantages. The unprotected teeth are exposed to corrosion. There is the fundamental risk of the operational reliability of the thrust preventer being prejudiced in the case of corroded tooth tips. In addition, the spigot end surface damaged by the action of the teeth is also exposed to corrosion. Thus, the life of the particular pipeline element is considerably reduced.

The fitting of a bead involves additional work and requires additional material. When carried out on the site, as is often the case when producing so-called short and fit lengths, this considerably increases costs. In addition, the quality is reduced. Excessive penetration of the bead, structural changes in the material and a destruction of the corrosion-resistant skin lead to the weakening of the pipeline element.

In another known construction (Swiss Pat. No. 569 913), the retaining ring is replaced by wedge-shaped retaining segments, which are inserted in recesses at the socket end, screw or pressure ring and by means of hammer blows moved into an area of the recesses with a smaller passage, so that a key joint is obtained.

All three constructions suffer from the aforementioned disadvantage with respect to the corrosion of the unprotected teeth. The construction with the recesses at the socket end involves a modification of all the socket core bushes required for producing the pipeline elements.

The construction with recesses on the screw and pressure ring require a modification to the corresponding molding equipment. Apart from a relative stiffening of the screw and gland-type socket joint, the disadvantage occurs that the functional requirements made on a socket joint by the prior art with respect to sealing and longitudinal non-positive engagement have to be overcome in two independent systems.

In another known construction (U.S. Pat. No. 4,330,143) the width of the retaining ring is greater than the pipe diameter, to prevent sliding of the spigot end when axial forces occur. However, this leads to a very considerable overall height, so that the thrust preventing ring is constructed as a flange and a similar flange is supported at the socket end. The thrust preventing ring is connected to the socket end flange by means of screw bolts. This construction is too complicated and expensive for most uses. Another disadvantage is the considerable stiffening of the joint, so that it can only be considered for special applications.

SUMMARY OF THE INVENTION

The present invention relates to a socket joint for two pipeline elements as aforesaid and also relates to a thrust preventer, in which a retaining ring with a spherical outer surface and a thrust preventing ring with a spherical inner surface are used, the latter being connected to the socket end. In the case of such a thrust preventer, the problem of the invention is to so develop a socket joint of the aforementioned type, that additional support means are associated with the retaining ring but bring about no change at the spigot end. In addition, the area where the teeth of the retaining ring engage on the spigot end surface and expose the latter is protected against corrosion.

According to the present invention prior art problems discussed above are solved in that between the socket-side end face of the retaining ring and the end face of the socket end an elastic gasket or packing is provided. Thus, the contact surfaces, on the one hand the toothed inner surface of the retaining ring and on the other the spigot surface of the pipeline element, are housed in an area which is closed off from the outside, so that corrosion of the contact surfaces is either prevented or at least reduced to an acceptable extent.

BRIEF DESCRIPTION OF THE DRAWINGS

The invention is described in greater detail hereinafter relative to two non-limitative embodiments and the attached drawings, wherein.

DETAILED DESCRIPTION OF THE PREFERRED EMBODIMENTS

Figure 1:
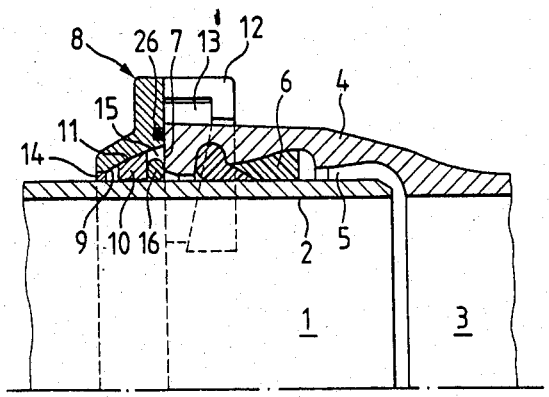
FIG. 1 is a longitudinal section through a socket joint, in which only half the pipe is shown.

In the socket joint between two pipeline elements shown in FIG. 1, one is a pipeline element 1 with a spigot end 2 and another pipeline element 3 with a socket end 4. Spigot end 2 is inserted in socket end 4 and between the two walls a gap 5 is formed, which is sealed by a gasket or packing 6. The inner wall of socket end 4 is provided with a profile with a view to obtaining a reliable mounting of gasket 6. To end face 7 of socket end 4 is connected a thrust preventing ring 8, whose inner surface 9 is spherical. The outer surface 11 of retaining ring 10 surrounded by thrust preventing ring 8 is also spherical.

The thrust preventing ring 8 has socket-side claws 12, which overlap a collar 13, which is in the form of individual ring portions separated by breaks for the passage of the claws 12, instead of being constructed as a closed ring. At the side of the thrust preventing ring 8 remote from socket end 4 is provided a packing element 14, e.g. a lip-type packing, which closes the gap between the thrust preventing ring 8 and the spigot end 2.

An O-ring 26 mounted in the thrust preventing ring 8 engages on end face 7 of socket end 4 and the said O-ring seals the contact faces of socket end 4 and thrust preventing ring 8 in the vicinity of end face 7.

A gap 15 containing a thrust ring 16 is located between retaining ring 10 and end face 7 of socket end 4. It is important that the thrust ring 16 is in thrust contact both with the side of retaining ring 10 facing socket end 4 and with the end face 7 of socket end 4 and also with spigot end 2, i.e. as a result of it being supported on end face 7 of socket end 4 and the surface of spigot end 2, it is able to exert a permanent pressure on the side of retaining ring 10 facing socket end 4. O-ring 26 and packing element 14 must also tightly seal the retaining ring chamber 15, so that the contact surface of teeth 18 and retaining ring 10 and the surface on spigot end 2 are largely free from corrosion attacks. The contact faces, the toothed inner surface of retaining ring 10, engages in the surface of spigot end 2, so that the protective coating applied to the pipeline elements is locally damaged and consequently the corrosion protection action thereof suffers. Thus, this area is constructed as a closed zone, called the retaining ring chamber 15, and it is sealed by packing elements 14 and 26 and elastic ring 16.

Figures 2, 3:
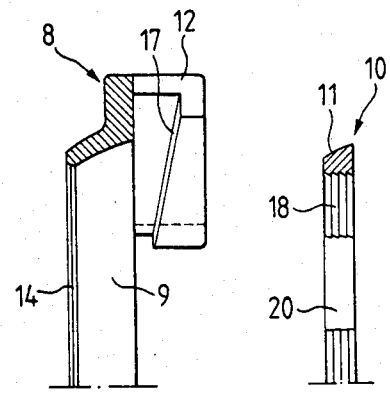
FIG. 2 is a section through a thrust preventing ring for the socket joint of FIG. 1.
FIG. 3 is a section through a retaining ring of the socket joint of FIG. 1.

FIG. 2 only shows the thrust preventing ring 8. It can be seen that the claws 12 have a sloping surface 17 enabling ring 8 to be fixed to the collar 13.

Retaining ring 10 shown in FIG. 3 is provided on its inner surface with a tooth system 18, e.g. in the form of grooves. Tooth system 18 is interrupted by recesses 20 and at these points retaining ring 10 does not rest on spigot end 2. Retaining ring 10 is appropriately slotted for achieving a greater elasticity.

The described socket joint is assembled in two phases, namely the insertion process and the non-positive engagement. In the former the pipeline elements 1, 3 to be connected are assembled, the socket gasket 6 exercising a sealing function. Prior to the insertion process and in preparation for the second assembly phase, the components required for the non-positive engagement of the socket joint, such as the thrust preventing ring 8, including packing elements 14, 26, retaining ring 10 and thrust ring 16, are placed on the spigot end 2 of the pipeline element.

The non-positive engagement of the per se longitudinally positive socket joint is achieved by means of the aforementioned thrust preventer. In the embodiment according to FIG. 1, the thrust preventing ring 8 is firmly connected to the socket end 4 by claws 12 or the thread 24 on the two-part threaded ring 23 in the case of the embodiment according to FIG. 4. During this assembly process the thrust preventing ring 8 carries out an axial displacement directed against the socket end 4 and also transferred to the retaining ring 10. Up to the two-sided contact of thrust ring 16 on the one hand with the side of retaining ring 10 facing socket end 4 and on the other with the end 2 face 7 of socket end 4, the spigot end of pipeline element 1 remains in position, i.e. it does not carry out the aforementioned axial displacement. Vital importance is attached for the purpose of the present invention to the processes which take place following the aforementioned two-sided contact of thrust ring 16 and which initiate the actual non-positive engagement of the socket joint. On continuing the axial displacement of thrust preventing ring 8, as a reaction to the force necessary for its deformation state, the thrust ring 16 exerts an equally large axial force directed against the retaining ring 10. As a result of the resolution of forces taking place on the spherical inner surface 9 of thrust preventing ring 8, a radial force directed against the pipe axis acts on the retaining ring 10 and initiates a penetration of tooth system 18 into the surface of spigot end 2, so that the socket joint is now longitudinally non-positive.

Additional longitudinal stresses of the non-positive socket joint, as can e.g. be produced by the pressure in the pipeline, lead to an increase in the engagement of the tooth system 18 on retaining ring 10 and further improve the non-positive engagement.

Figure 4:
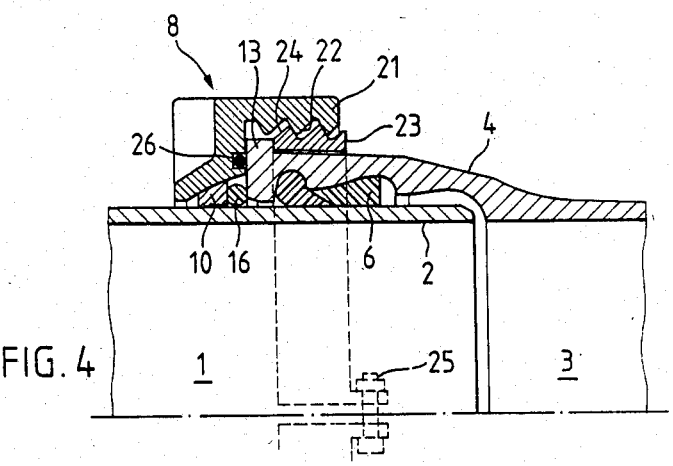
FIG. 4 is a longitudinal section through a second embodiment of a socket joint.

In the case of the socket joint according to FIG. 4, the thrust preventer is constructed in the same way as in the embodiment according to FIG. 1. The same reference numerals designate the same parts.

Whereas in FIG. 1 the thrust preventing ring 8 is connected in bayonet catch-like manner with socket end 4, ring 8 of the embodiment according to FIG. 4 is screwed to the socket end 4. Thus, at the socket side, the thrust preventing ring has a cylindrical connection 21, on whose inside is provided an internal thread 22. On the outer circumference of socket end 4 in the vicinity of collar 13, which can in this case be constructed as a complete wing, is fixed a two-part ring 23, which is provided on its outer circumference with an external thread 24 onto which the thrust preventing ring 8 is screwed, so that a firm, positive engagement with the socket end 4 is obtained. FIG. 4 shows the construction of the two-part ring in broken line form. The two halves of the ring are drawn together, e.g. by screw bolts 25.

Figure 5:
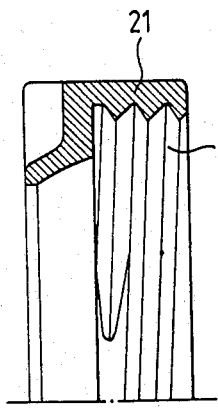
FIG. 5 is a section through a thrust preventing ring for the socket joint according to FIG. 4.
Figure 6:
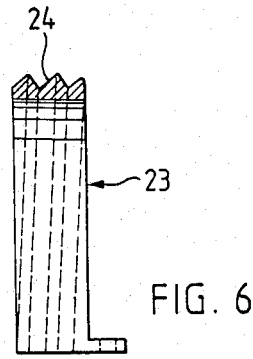
FIG. 6 is a section through an intermediate ring for the socket joint according to FIG. 4.

FIGS. 5 and 6 show the construction of the thrust preventing ring 8 and the two-part threaded ring 23. Pipeline elements 1, 2 can be made from grey cast iron, ductile cast iron or plastic, while the gasket 6, packing element 14 and thrust ring 16 can be made from an elastomer, e.g. natural or synthetic rubber.

The present socket joint has numerous advantages.

The functional requirements of "sealing" and "thrust preventing", are constructionally satisfied in two separate systems, namely the sealing action with the long-proven socket joint and the non-positive engagement or thrust prevention with the aforementioned thrust preventer.

The aforementioned construction permits a manufacture of the socket pipes, shaped parts and fittings without any change to the existing molding means and core bushes, while retaining the introduced range.

The marketing of the newly developed socket joint can take place at limited cost and no additional costs are involved for storage.

It requires no bead at the spigot end of the pipeline element to be secured. This is particularly important when producing so-called short and fit lengths on the site. There is no need for manual welding or the subsequently necessary cleaning operation on the internal coating. There are no fears regarding considerably weakened wall thicknesses due to welding penetration, structural changes in the material and the expected corrosion attacks. No welders are required for assembly purposes. This leads to considerable cost savings both during manufacture and during assembly, while at the same time improving quality.

A choice can be made between an electrically bridged or insulated construction, without having to use other pipeline elements.

Thus, there may be an electrical bridging between the pipeline elements comprising forced transition contacts between one pipeline element and the retaining ring, between the retaining ring and the thrust preventing ring and between the thrust preventing ring and the other pipeline element. There also may be an electrically insulating coating on the inner surface of the thrust preventing ring or on the outer surface of the retaining ring.

The invention makes it possible to bring about an optimum penetration of the teeth on the retaining ring into the spigot end surface of the pipeline element to be secured. This makes it possible to appropriately vary by constructional measures the radial force to be transferred from the retaining ring onto the spigot end surface, so that there is no over stressing at the spigot end 2 of pipeline element 1.

There is no limitation to the displacement possibility.

The thrust preventer described only has a relatively small external diameter, which is significant in the area of the socket outer contour in the case of insulated pipelines with regards to the dimensioning of the jacket tube or in the case of pipeline elements laid in sewers with respect to the sewer profile, this being advantageous from the cost standpoint.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A socket joint for two pipeline elements, in which the spigot end of one pipeline element is inserted in the socket end of the other pipeline element and is sealed by an elastomeric gasket, which comprises a retaining ring mounted on the outer circumference of the spigot end of one pipeline element, said retaining ring having a socket-side end face, a thrust or shear preventing ring supported by said retaining ring circumscribing said spigot end and fixed to the socket end of the other pipeline element, an elastic thrust ring arranged between the socket-side end face of the retaining ring and the socket end, packing elements associated with the thrust preventing ring on both the side remote from and that facing the socket end, wherein the ring is positioned between said packing elements and within the thrust ring, and a closed corrosion protection zone between the retaining ring and socket end sealed by said packing elements and thrust ring.

2. A socket joint according to claim 1 wherein one of the packing elements is an elastic lip-type packing and the other is an elastic gasket.

3. A socket joint according to claim 1 including an intermediate ring having an external thread, said intermediate ring embracing the socket end of the other pipeline element, wherein the thrust preventing ring has a cylindrical connection with an internal thread which is screwed onto said external thread of the intermediate ring.

4. A socket joint according to claim 3 wherein the intermediate ring is constructed as a split ring.

5. A socket joint according to claim 4 wherein said split ring comprises two half rings which are screwed together at their ends.

6. A socket joint according to claim 1 wherein the retaining ring is constructed as a split ring and has on its contact face embracing the spigot end on the inner circumference thereof means permitting the securing thereof to the outer circumference of the spigot end.

7. A socket joint according to claim 6 wherein said means comprises teeth.

8. A socket joint according to claim 6 wherein said means comprises projections.

9. A socket joint according to claim 6 wherein said inner circumference of the retaining ring has recesses forming contact-free zones between parts of the contact face.

10. A socket joint according to claim 1 wherein there is an electrical bridging between the pipeline elements comprising forced transition contacts between one pipeline element and the retaining ring, between the retaining ring and the thrust preventing ring and between the thrust preventing ring and the other pipeline element.

11. A socket joint according to claim 1 wherein there is an electrically insulating coating on the inner surface of the thrust preventing ring.

12. A socket joint according to claim 1 wherein there is an electrically insulating coating on the inner surface of the thrust preventing ring or on the outer surface of the retaining ring.

* * * * *